United States Patent [19]

Kiezebrink

[11] 3,929,554

[45] Dec. 30, 1975

[54] DEVICE FOR MANUFACTURING FIBRE REINFORCED PLASTIC TUBES

[75] Inventor: Willem Kiezebrink, Hardenberg, Netherlands

[73] Assignee: Wavin B.V., Zwolle, Netherlands

[22] Filed: June 14, 1973

[21] Appl. No.: 369,844

[30] Foreign Application Priority Data
June 14, 1972 Netherlands.................... 7208096

[52] U.S. Cl............... 156/425; 156/446; 156/499; 156/538
[51] Int. Cl.².................... B31C 1/02; B31C 1/08
[58] Field of Search........... 156/173, 175, 184, 195, 156/429, 431, 425, 446, 448, 449, 456, 458, 499, 538; 242/18 R, 35.5 A, 35.5 T; 198/102, 103

[56] References Cited
UNITED STATES PATENTS

| | | | |
|---|---|---|---|
| 1,664,663 | 5/1928 | Coil et al. ............................ | 198/103 |
| 2,358,563 | 9/1944 | Donaldson......................... | 198/102 |
| 2,850,142 | 9/1958 | Engleson et al. .................. | 198/103 |
| 3,063,887 | 11/1962 | Labino................................ | 156/184 |
| 3,087,596 | 5/1963 | Fulton................................. | 198/103 |
| 3,344,009 | 9/1967 | Levecque............................ | 156/458 |
| 3,347,725 | 10/1967 | Stephens et al..................... | 156/184 |
| 3,446,690 | 5/1969 | Charles................................ | 156/446 |
| 3,580,790 | 5/1971 | Pollmeier et al.................... | 156/458 |
| 3,607,566 | 9/1971 | Medney et al...................... | 156/458 |
| 3,695,965 | 10/1972 | Current et al. ..................... | 156/458 |

Primary Examiner—Douglas J. Drummond
Assistant Examiner—Basil J. Lewris
Attorney, Agent, or Firm—Watson, Cole, Grindle & Watson

[57] ABSTRACT

A device for manufacturing fibre reinforced pipes comprising a core and a heating element, and endless chains cooperating with the toothing of a gear wheel being secured to the shaft of the core for rotatingly conveying the core. The shaft of the core is also provided with bearings which are received in jaws of a lever mechanism, said lever mechanism being movable from a first position for winding fibres onto the core to a second position for delivering the core onto the endless chains.

4 Claims, 3 Drawing Figures

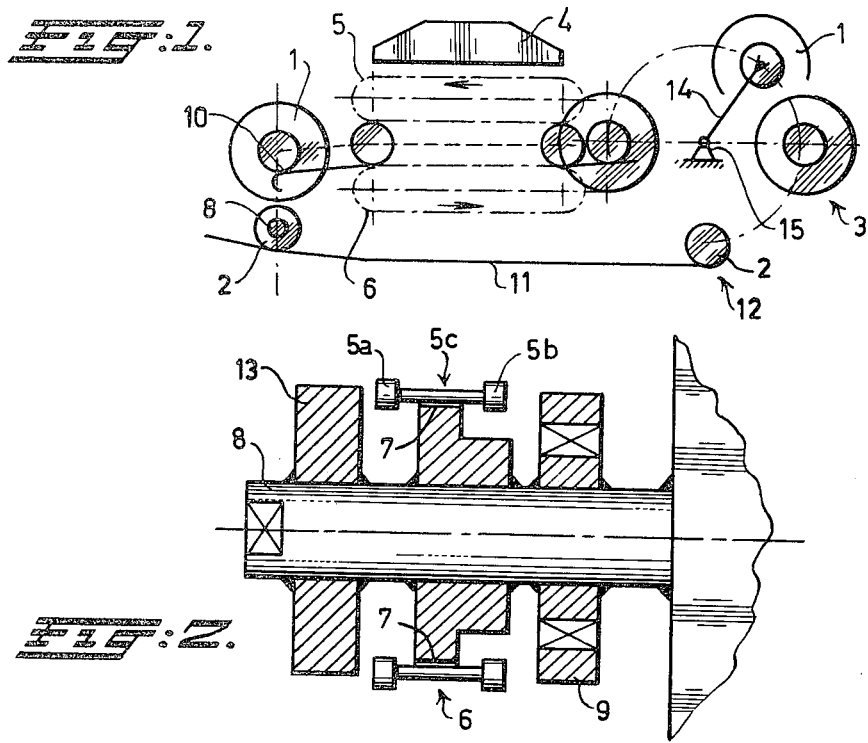
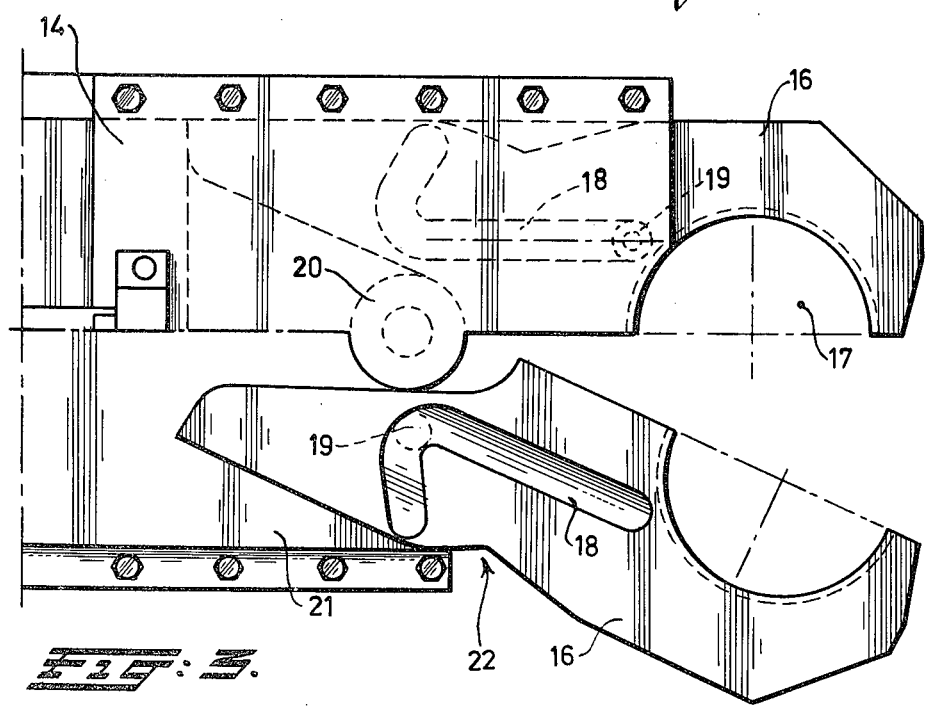

3,929,554

DEVICE FOR MANUFACTURING FIBRE REINFORCED PLASTIC TUBES

DISCUSSION OF THE PRIOR ART

The invention relates to a device for manufacturing fibre reinforced plastic pipes.

It is known in the art to manufacture plastic pipes by means of cores disposed in winding devices, while glass rovings, previously impregnated with a thermosetting resin, like a polyester or epoxy resin, are wound about these cores. After the winding operation the core with the fibres wound thereabout should be heated in order to cause the synthetic resin to set to thereby obtain a pipe with the desired strength.

So far it is usual to carry out these operations in a non-automatic process, by using devices which are inconvenient to use.

SUMMARY OF THE INVENTION

It is an object of the invention to provide a device for manufacturing fibre reinforced plastic pipes, enabling to automate almost the entire manufacture of fibre reinforced plastic pipes by means of cores, while moreover the apparatus required for the manufacture of fibre reinforced plastic pipes occupies little space as compared with the prior art apparatus for the manufacture of the afore mentioned pipes.

This object is attained according to the invention in that the device for manufacturing fibre reinforced pipes comprises A. a core about which the reinforcing fibres can be wound,
B. a heating member for heating the core with the fibres and resin applied thereto,
C. a conveyor for rotatively conveying the core past the heater,
D. a lifting member which can be brought to a first position for moving the core from a supply station into a winding device and which subsequently can be brought to a second position for conveying the core from the winding device towards the conveyor, and
E. return means for returning the core after same has passed by the heater.

With such a device, wherein the conveyor for rotatively conveying the core past the heater is also used to return the core to its starting position after removal of the finished pipe, and moreover the lifting member can be brought to a first position for moving the core from a supply station into a winding device, and subsequently to a second position for conveying the core from the winding device to the conveyor, it is possible to reduce the space occupied considerably, while moreover the entire device can be used for an almost continuous manufacture of fibre reinforced plastic pipes.

Advantageously the lifting member consists of a lever moving the core from the supply station into a winding device and subsequently, by swinging further in an upward direction, conveying the core toward the conveyor.

The conveyor consists preferably of a pair of upper chains and a pair of lower chains which in an effective part of their path run in a parallel direction, while the chains can be driven in opposite directions and the core carries a shaft on which is fixedly secured a gear wheel the toothing of which cooperates with the links of the chains, the arrangement being such that the core is rotatively conveyed. In this way it is achieved that by imparting a different velocity to the lower and upper chains a conveying effect combined with a fast rotation of the core is obtained.

BRIEF DESCRIPTION OF THE DRAWINGS

FIG. 1 shows in outline a device according to the invention;
FIG. 2 shows a detail of a core with chain, and
FIG. 3 represents a detail of the core receiving members of the lever which convey the core.

DETAILED DESCRIPTION OF THE DRAWINGS

FIG. 1 represents diagrammatically a device for manufacturing fibre reinforced plastic pipes 1, by winding reinforcing fibres on a core 2. The reinforcing fibres consists mostly of glass rovings which prior to being wound on the core are passed through a bath of polyester resin. The winding operation is performed in a winding device. After the pipe has been formed by winding the fibres the thermosetting resin should be cured and to that end a heating member 4 is provided for heating the core 2 with the fibre reinforced plastic pipe disposed thereon. This heating member 4 is mostly disposed in an oven and consists e.g. of a heat radiator.

A conveyor 5a serving to convey rotatively the core 2 together with the plastic pipe 1 thereon past the heating member 4 is also arranged. This conveyor is built up from two pairs of upper chains 5 and two pairs of lower chains 6. These chains 5, 6, respectively, can each be driven individually and run then in opposite directions. The two pairs of chains 5 are spaced from each other in such a way that the toothings 7 on the protruding shafts 8 of the core cooperate with a chain 5, 6 respectively.

The drive of the chain 5, 6 respectively is chosen in such a way that the chains 6 run about 1/30 faster than the upper chains, 5. As a consequence the core will be rotatively advanced, due to the cooperation of the toothings 7 with the chain 5, 6 respectively, through the oven and past the heating member 4. During this transport the shaft 8 of the core 2 is supported by supporting rollers or bearings 9 which allow a free rotation of the core, but ensure on the other hand that the core can be conveyed along guides which are not further indicated.

After having passed by the heating member the finished pipe with the core 2 arrives at the pipe removing station where the pipe is removed from the core. This can e.g. be effected by subjecting the pipe from the side of the core to a particular pressure whereby the pipe is pushed from the core.

The core 2 rolls subsequently along a guide path 10 to a lower guide path 11 along which the core is moved toward the core feeding station 12. During this transport the toothings 7 on the shaft of the core cooperate with the underside of the lower chains 6 while the core 8 is further supported by the supporting roller 13. On arrival at the core feeding station 12 a lever 14 which is pivoted about a shaft 15 transfers the core to the winding device 3, while after the glass fibres have been wound on the core 2, the same lever 14 turns further upwards while taking along the core 2 together with the synthetic resin and reinforcing fibres wound thereon in order to move the core to a position for conveyance through the oven with heating member 4. The core is then deposited on a guide path (not shown), whereupon by means of the chains 5 and 6 it is advanced and rotated. Since the metal core, which mostly has a length of 10 meters, expands considerably on being moved past the heating member 10 it is advisable to construct each chain from two chains, e.g. 5a and 5b, which are interconnected by pins 5c.

Although it is indicated hereinbefore that the shaft 8 of the core is caused to run in guides by means of guide rollers 9 or supporting rollers 13 it is evident that also equivalent means known to a person skilled in the art may be selected.

Of special importance in the present device is the application of the lever 14 which is rotatable about the shaft 15. This lever 14 conveys a core 2 from the core feeding station 12 to the winding device 3, at which location the core is released and provided with reinforcing fibres and synthetic resin. Thereupon the same lever grabs again the core provided with glass fibres and synthetic resin and turns same via its highest position toward the heating oven within which heating member 4 is located.

Due to the application of such a lever which essentially performs a rotary movement the desired treatments can be performed in a very limited space. The lever is in fact symmetrically arranged between the winding device and the inlet of the oven with the heating member 4.

It is obvious that the cores 2 can be easily conveyed by means of the lower chains 6 to the core feeding station 12 without the assistance of manual labor, while on the other hand nevertheless a very gradual displacement of the core 2 from the end of the oven with heating member 4 toward the core supplying station 12 is effected. If the core 2 was merely deposited on an inclined guide path slanting in the direction of the core supplying station then the rather heavy core would move very fast toward that station, but in that case the core would land there with all inconveniences attended therewith as to damage to the cores, etc.

The afore mentioned trouble is overcome by regulating the return of the core 2 by means of the underside of the lower chains 6, so that the core never lands at a too fast rate in the core supplying station. In general it can be said that the core 2 is returned from the end of the oven toward the core supplying station 12 in almost the same time as required for the conveyance of the core with reinforcing fibres with synthetic resin applied thereto from the entrance of the oven with heating member 4 to the end thereof.

As a consequence a very synchronous operation of the device is obtained.

For grabbing the protruding shafts 8 of the core a device can be used which is fragmentarily represented in FIG. 3. In this device two jaws 16 are represented which in a closed condition delimit a space 17 in which the shafts 8 of the core can be accommodated. These jaws 16 are provided with a groove 18 and a cam roller 19. By means of an aid 20 with cheeks 21 the jaw 16 can move in the direction of the other jaw. The location and the shape of the groove 18 in which travels the cam roller 19 are selected in such a way that when the cheeks 21 cooperate with the side 22 of the jaw 16 the latter is moved in the direction of the other jaw while forming the opening 17 in the configuration of a closed circle.

The circular opening 17 has a size such that the outer side of the supporting roller 9 can be clamped in the opening 17. Since the supporting roller 9 is also constructed as a bearing the core remains freely rotatable so that the core can be used in the winding device without having been removed from the jaws 16. So far it is normally usual to dispose such cores in separate bearings of a winding machine.

For driving the core during the winding operation gears can be used (not shown) which cooperate with the gear wheel 7 fixedly mounted on the shaft 8 of the core 2.

Although not shown in the drawing a lever analogous to that denoted by 14 can be efficiently disposed past the upper chains 5 and lower chains 6. This lever (not shown) operating in the same way as the lever 14 grabs the core again by means of the jaws, whereupon the core is put on a support. This support is constructed in such a way that from one of the fixed points of the support a very long arm extends in the direction of the core, while the shaft of the core bears on the end of the arm. Thereupon the collapsible core 2 is collapsed, after which the pipe axially slides from the core and as a consequence lands on the supporting arm which is in alignment and in juxtaposition with the core. After the pipe has been slid from the core the latter is again grabbed by the jaws of the lever in such a way that supporting roller 9, constructed as a bearing, cooperates with the jaws. The core is then again extended and cleaned. A rotary motion is imparted to the core which becomes possible due to the supporting rollers 9 serving as bearings.

Thereupon the lever is turned in the direction of the support 11, whereupon the core after placement on the support 11 is conveyed due to the action of the chains 6 on the chain wheel 7, in the direction of the core supplying station 12.

It is obvious that the device can be advantageously constructed in such a way that the lever mechanism 14 is integral with the winding device 3. In this case a winding device known per se is provided with a lever mechanism with grip cheeks 16 in which supporting rollers 9 of a core 2 are received. After the winding operation the lever can lift the core from the winding machine by means of a pneumatic action and subsequently due to swinging motion dispose the core, with the pipe wound thereon, between the chains. Thereupon the lever takes again a new core 2 and puts same in the winding machine by swinging back to the position required for the winding machine and subsequently returning to its original position, whereupon the core can rotate in the winding machine.

Such winding machines are advantageous in that while keeping down the occupied space to a minimum pipes can be manufactured by winding and also be simply removed from the machine.

What I claim is:

1. An apparatus for manufacturing fiber reinforced pipes, comprising:
    a core on which reinforcing fibers can be wound, said core having a pair of shafts, one shaft extending outwardly from each side of said core, and a pair of gear wheels having gear teeth, one gear wheel being fixedly mounted on each of said shafts;
    a heater for heating said core with the fibers and resins applied thereto;
    a conveyor extending through said heater and comprising a movable upper chain having links and a movable lower chain having links, said chains being spaced apart and being substantially parallel, means for driving said chains in opposite directions relative to one another and at different speeds, said gear wheel teeth engaging said links of said chains whereby said core rotates while simultaneously being conveyed through said heater;

a core lifting device mounted for movement of said core from a supply station to a winding device provided for the apparatus, said lifting device also being mounted for subsequent movement of said core from said winding device toward said conveyor; and a return means for returning said core after it has been conveyed through said heater, said return means further including means to control the rate of return of said core.

2. The apparatus according to claim 1, wherein each of said conveyor chains are endless chains having upper and lower chain runs, said return means including a guide support located parallel to and below said lower chain, a roller bearing fixedly secured to said shaft of said core, said roller engaging said guide support, and said lower run of said lower chain engaging said gear wheel for rotationally conveying said core along said guide support and returning it to said winding device after having passed through said heater.

3. The apparatus according to claim 1, wherein each of said claims respectively include a pair of chain elements spaced apart and being interconnected by pins.

4. The apparatus according to claim 1, wherein a pair of said shafts are provided and respectively extend outwardly of opposite sides of said core, roller bearings fixedly secured to each of said shafts, and said core lifting device comprising two pairs of spaced clamps respectively movable into clamping engagement with said roller bearings and movable out of said clamping engagement to effect said movement of said core and said subsequent movement thereof.

* * * * *